UNITED STATES PATENT OFFICE.

WILLIAM THUM, OF HAMMOND, AND JOHN J. MULLIGAN, OF EAST CHICAGO, INDIANA, AND HENRY M. SCHLEICHER, OF BOSTON, MASSACHUSETTS, ASSIGNORS TO UNITED STATES SMELTING, REFINING & MINING COMPANY, A CORPORATION OF MAINE.

METHOD OF MAKING ARSENICAL SALTS.

1,356,569. Specification of Letters Patent. Patented Oct. 26, 1920.

No Drawing. Application filed June 28, 1919. Serial No. 307,431.

*To all whom it may concern:*

Be it known that we, (1) WILLIAM THUM, (2) JOHN J. MULLIGAN, and (3) HENRY M. SCHLEICHER, citizens of the United States, residing at (1) Hammond and (2) East Chicago, both in the county of Lake and State of Indiana, and at (3) Boston, in the county of Suffolk and Commonwealth of Massachusetts, have invented certain new and useful Improvements in Methods of Making Arsenical Salts; and we do hereby declare the following to be a full, clear, and exact description of the invention, such as will enable others skilled in the art to which it appertains to make and use the same.

The invention relates to the manufacture of the arsenical salts of lead, calcium or analogous metals having insoluble sulfates.

The primary feature of the invention consists in the direct conversion of the insoluble sulfate of the metal into its arsenical salt by the action of a solution of a soluble arsenical salt, such for instance as sodium arsenate, upon the sulfate. The sulfate is preferably in a finely divided state adapted to be held in suspension in the solution so that it may be thoroughly mixed with and will readily react with the soluble arsenical salt to form a precipitate of the arsenical salt of the metal. The mixing of the compounds may be effected in a dry state before the formation of the solution in which the reactions, which result in the production of the arsenical salts, take place, but we prefer to mix the compounds by first forming a pulp in which the finely divided sulfate is held in suspension in water, and then mixing the pulp with a water solution of the soluble arsenical salt, since by this mode of procedure highly satisfactory results have been secured.

While the invention may be applied to the production of various arsenical salts of a number of metals, it is particularly applicable to the commercial manufacture of lead arsenate or calcium arsenate and will be specifically described with reference to the manufacture of these arsenical salts.

The preferred mode of procedure in producing lead or calcium arsenate from the corresponding sulfates in accordance with our invention is as follows:

The lead or calcium sulfate may be a waste or by-product of some of the chemical industries, in which case it may be obtained in a dry form or as a finely divided chemical precipitate in the form of magma. Calcium sulfate is also obtainable in its natural state as the mineral gypsum. In case the sulfate to be used is not in a finely divided state, it is ground to a fine powder before being subjected to the action of the soluble arsenical salt. In the case of lead sulfate obtained as a by-product of chemical industries and containing soluble impurities, it is preferable to first remove these impurities, as by subjecting the sulfate material to a preliminary water leaching, filtering and washing process.

The finely divided sulfate is mixed with water by stirring agitation or otherwise until it forms a pulp in which the particles of the sulfate are held in suspension. In the case of lead sulfate, a mixture by weights of approximately one part of lead sulfate to ten parts of water, and in the case of calcium sulfate, a mixture of approximately one part of calcium sulfate to five parts of water has been found to be suitable for our practice, but a wide range of such proportions is permissible. This pulp is fed slowly and gradually, either intermittently or continuously, by any suitable means, to a solution of a soluble arsenate. We preferably use a ten per cent. solution of sodium arsenate in water. Constant stirring agitation of the mixture should be kept up during the mixing operation. The conversion of the insoluble sulfate into the arsenate of the corresponding metal takes place readily. The arsenate of lead or calcium formed is of flocculent character, and therefore remains readily in suspension during the agitation. Agitation is preferably continued for a short time after all the ingredients have been mixed, which operation is conducive to complete conversion and to the flocculency of the product.

To insure a complete conversion of the sulfate, we prefer to subject the mixture to attrition as well as to agitation, as for instance by agitating the mixture in a porcelain ball mill. This serves to break up any particles of the sulfate which might otherwise be but partially reduced, and brings all the sulfate into intimate contact with the soluble arsenate so that it is completely reduced. While the reactions take place at normal temperatures, we have found it expedient for conversion of the sulfate and to the flocculency of the arsenate formed, to heat all the solutions and pulps during the operations to a temperature of between 160° and 212° F., although such heating may be found more or less superfluous in case the mixture is subjected to attrition as above described.

After completing the reaction, the arsenate precipitate is preferably left to settle in the reaction mixing tank or mill and the clear solution is decanted for further treatment for the recovery of any by-product, such as sodium sulfate, by the evaporation of the excess water. The residual arsenate magma is further washed in the usual manner to any degree of moisture retaining paste, or the same is dried and fine-ground into an arsenate powder if such is desired. The following reactions are representative of the reactions taking place, showing the combining proportions of the base and arsenate salts of sodium:

1. $2Na_3AsO_4 + 3PbSO_4 = Pb_3(AsO_4)_2 + 3Na_2SO_4$
2. $2Na_2HAsO_4 + 2PbSO_4 = 2PbHAsO_4 + 2Na_2SO_4$
3. $3Na_2HAsO_4 + 3PbSO_4 = Pb_3(AsO_4)_2 + 3Na_2SO_4 + H_3AsO_4$
4. $2Na_3AsO_4 + 3CaSO_4 = Ca_3(AsO_4)_2 + 3Na_2SO_4$
5. $2NaHAsO_4 + 2CaSO_4 = 2CaHAsO_4 + 2Na_2SO_4$
6. $3Na_2HAsO_4 + 3CaSO_4 = Ca_3(AsO_4)_2 + H_3AsO_4 + 3Na_2SO_4$

Reactions 3 and 6 occur particularly in too dilute solutions.

The reactions given above produce the lead arsenate salts commonly used as insecticides, or the corresponding calcium arsenate salts, which may be used for the same purpose, or for other purposes, or a mixture of the normal and acid sodium arsenate salts will result in a mixture of the two possible arsenate compositions. It may be found desirable to produce either tri or di salt of lead or calcium arsenate, or a mixture of the tri or di salts. By using an addition of a calculated amount of caustic alkali, such as caustic soda, we may obtain a conversion of the arsenical sodium salt reagent from the di to the tri salt during the operations described above. In any case the amount of the base (lead or calcium) contained in the sulfate should be adjusted to the theoretical combining weights of arsenate in the arsenate solution, although we have found that a slight excess of the arsenate is beneficial in obtaining the desired results.

The method described enables lead or calcium arsenate to be easily and economically produced from material which occurs in nature as a common mineral or which is produced in large quantities as a by-product or waste product in various processes of the chemical industries. The method also enables the recovery of the soluble sulfate by-products, such as sodium sulfate, in case the sodium arsenate is used as the soluble arsenical salt.

By the use of an arsenite instead of an arsenate as the soluble arsenical salt, an arsenite, such for instance as calcium arsenite, may be produced if found desirable. In such cases, the reactions taking place upon the mixture of the finely divided sulfate with the solution of the soluble arsenite, such as sodium arsenite, are indicated as follows:

$2NaAsO_2 + CaSO_4 = Ca(AsO_2)_2 + Na_2SO_4$
$Na_4As_2O_5 + 2CaSO_4 = Ca_2As_2O_5 + 2Na_2SO_4$

Other arsenical salts might be secured by variation of the soluble arsenical salt utilized in the solution with which the finely divided insoluble sulfate is mixed.

While the method of procedure outlined above secures the desired results in an efficient and economical manner, it will be understood that other modes of procedure may be utilized without departing from the broader scope of the invention, and that more or less unnecessary and complicating steps might be introduced without departing therefrom. For instance, the arsenical solution might be added to the sulfate, or the sulfate and soluble arsenical salt might be mixed in a wet or dry state and then lixiviated with or without agitation to subject the sulfate to the action of a solution of arsenical salt. It will also be understood that any manner of agitation, with more or less mechanical attrition, may be utilized. Other modifications or variations in the specific mode of procedure in practising the invention may suggest themselves to persons skilled in the art.

The present application is a continuation in part of application, Serial No. 262,700, filed November 15, 1918.

Having thus described our invention, what we claim is:

1. The method of making arsenical salts which consists in converting an insoluble sulfate of a metal directly into an arsenical salt of the metal by the action thereon of a solution of a soluble arsenical salt.

2. The method of making arsenates which consists in converting an insoluble sulfate of a metal directly into an arsenate of the metal by action thereon of a solution of sodium arsenate.

3. The method of making lead arsenates which consists in converting lead sulfate directly into lead arsenate by the action thereon of a solution of sodium arsenate.

4. The method of making arsenates which consists in subjecting an insoluble sulfate of a metal to the action of a solution of a soluble arsenical salt in which the sulfate is held in suspension.

5. The method of making arsenical salts which consists in subjecting a water solution of a soluble arsenical salt in which finely divided insoluble sulfate of a metal is held in suspension to agitation and attrition.

6. The method of making arsenical salts by the direct conversion of an insoluble sulfate of a metal into an arsenical salt of the corresponding metal by mixing the sulfate with a soluble arsenical salt in a manner to allow the constituents of the mixture to react upon each other.

7. The method of making arsenates by direct conversion of an insoluble sulfate of a metal into the arsenate of the corresponding metal by mixing the sulfate with a soluble arsenate in a manner to allow the constituents of the mixture to react upon each other.

8. The method of making lead arsenates by the direct conversion of lead sulfate into lead arsenate by mixing lead sulfate with a soluble arsenate in a manner to allow the constituents of the mixture to react upon each other.

9. The method of making lead arsenate which consists in mixing a pulp in which lead sulfate is held in suspension in water with a water solution of sodium arsenate.

10. The method of making arsenates which consists in mixing a pulp in which an insoluble sulfate of a metal is held in suspension in water with a water solution of a soluble arsenate and subjecting the mixture to agitation and attrition.

11. The method of making lead arsenate which consists in mixing a pulp in which lead sulfate is held in suspension in water with a water solution of sodium arsenate and subjecting the mixture to agitation and attrition.

12. The method of making arsenates which consists in mixing a pulp in which an insoluble sulfate of a metal is held in suspension in water with a water solution of a soluble arsenate while maintaining the solution, pulp and mixture at a temperature of between 160° and 212° F.

13. The method of making lead arsenate which consists in mixing a pulp in which lead sulfate is held in suspension in water with a water solution of sodium arsenate while maintaining the pulp, solution and mixture at a temperature of between 160° and 212° F.

14. The method of making arsenates which consists in mixing a pulp in which an insoluble sulfate of a metal is held in suspension in water with a water solution of sodium arsenate in the presence of caustic soda.

WILLIAM THUM.
JOHN J. MULLIGAN.
HENRY M. SCHLEICHER.